(12) United States Patent
Rakshit et al.

(10) Patent No.: US 11,099,406 B2
(45) Date of Patent: Aug. 24, 2021

(54) DELIVERING AUGMENTED REALITY VIA EMBEDDED CONTACT LENS

(71) Applicant: INTERNATIONAL BUSINESS MACHINES CORPORATION, Armonk, NY (US)

(72) Inventors: Sarbajit K. Rakshit, Kolkata (IN); James E. Bostick, Cedar Park, TX (US); John M. Ganci, Jr., Raleigh, NC (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 16/256,439

(22) Filed: Jan. 24, 2019

(65) Prior Publication Data
US 2020/0241322 A1 Jul. 30, 2020

(51) Int. Cl.
*G02C 7/04* (2006.01)
*G02B 27/00* (2006.01)
(Continued)

(52) U.S. Cl.
CPC .......... *G02C 7/04* (2013.01); *G02B 27/0093* (2013.01); *G06T 19/006* (2013.01);
(Continued)

(58) Field of Classification Search
CPC .......... G02C 7/04; G02C 7/049; G02C 7/047; G02C 2202/22; G02C 7/048; G02C 7/021; G02C 7/022; G02C 7/06; G02C 7/083; G02C 2202/16; G02C 2202/24; G02C 7/027; G02C 7/028; G02C 7/046; G02C 2202/06; G02C 7/024; G02C 7/041; G02C 7/042; G02C 7/044; G02C 7/061;
(Continued)

(56) References Cited

U.S. PATENT DOCUMENTS

| | | |
|---|---|---|
| 6,078,380 A | 6/2000 | Taniguchi |
| 6,851,805 B2 | 2/2005 | Blum |

(Continued)

FOREIGN PATENT DOCUMENTS

CN 103543537 A 1/2014

OTHER PUBLICATIONS

M. Elgan, "Why a smart contact lens is the ultimate wearable," May 9, 2016 [Accessed Feb. 12, 2018] https://www.computerworld.com/article/3066870/wearables/why-a-smart-contact-lens-is-the-ultimate-wearable.html.

(Continued)

*Primary Examiner* — William R Alexander
*Assistant Examiner* — Sharrief I Broome
(74) *Attorney, Agent, or Firm* — Brian M. Restauro, Esq.; Wayne F. Reinke, Esq.; Heslin Rothenberg Farley & Mesiti P.C.

(57) ABSTRACT

A system, method and program product for delivering augmented reality content to a user includes a data processing system receiving data indicating the focal point of the contact lens user and delivering augmented reality content to the user via the contact lens at the focal point, the data including data regarding a shape of an eye lens. Alternatively, the data is based on a cognitively predicted activity of the user, the cognitively predicted activity being based on contextual information.

19 Claims, 6 Drawing Sheets

(51) Int. Cl.
  *G06T 19/00* (2011.01)
  *G02B 27/01* (2006.01)
  *G06F 3/01* (2006.01)
  *G02C 7/08* (2006.01)

(52) U.S. Cl.
  CPC .... *G02B 27/0172* (2013.01); *G02B 2027/014* (2013.01); *G02C 7/08* (2013.01); *G06F 3/013* (2013.01)

(58) Field of Classification Search
  CPC ............... G02B 1/043; G02B 27/0025; G02B 27/0075; G02B 27/4205; G02B 3/00; G02B 5/1828; G02B 1/041; G02B 2027/0123; G02B 27/0037; G02B 27/0172; G02B 27/4211; G02B 3/0081; G02B 5/18; G02B 5/1895; G02B 2027/015; G02B 5/30; G02B 1/04; G02B 5/20; G02B 1/115; G02B 1/18; A61F 2/16; A61F 2/1613; A61F 2/1648; A61F 2250/0002; A61F 2/14; A61F 2/1624; A61F 2/1627; A61F 2/1635; A61F 9/0017; A61F 2002/1699; A61F 2240/001; A61F 2250/0053; A61F 2/142; A61F 2/145; A61F 2/1618; A61F 2/1637; A61F 2002/0894; A61F 2002/1681; A61F 2002/1696; A61F 2002/16965; H01L 2224/13109; H01L 2924/00014; H01L 2924/0105; H01L 2924/01083; H01L 2924/013; H01L 2924/20105; H01L 2224/11312; H01L 2224/16225; H01L 2224/2919; H01L 2224/32225; H01L 2224/73204; H01L 2224/81203; H01L 2224/83203; H01L 2924/10253; H01L 2224/05599; H01L 2224/83104; H01L 2924/00; H01L 2924/00012; H01L 2924/00013; H01L 2924/0665; B29D 11/00038; B29D 11/00048; B29D 11/00125; B29D 11/00009; B29D 11/0048; B29D 11/00105; B29D 11/00346; B29D 11/00567; B29D 11/00634; B29D 11/00644; B29D 11/00; B29D 11/00057; B29D 11/00067; B29D 11/00076; B29D 11/00134; B29D 11/00182; B29D 11/00192; B29D 11/00221; B29D 11/00259; B29D 11/00317; A61L 31/10; A61L 2430/16; A61L 29/085; A61L 2300/404; A61L 27/54; A61L 12/086; A61L 12/12; A61L 12/124; A61L 12/142; A61L 12/143; A61L 12/145; A61L 2300/202; A61L 2300/208; A61L 2300/606; A61L 2400/10; A61L 2400/12; A61L 2420/02; A61L 2420/08; A61L 27/025; A61L 27/16
  See application file for complete search history.

(56) References Cited

U.S. PATENT DOCUMENTS

| | | | |
|---|---|---|---|
| 9,292,973 B2 | 3/2016 | Bar-Zeev | |
| 9,392,129 B2 * | 7/2016 | Simmons | ........... G02B 26/0816 |
| 9,465,237 B2 | 10/2016 | Tate | |
| 9,500,884 B2 | 11/2016 | Egan | |
| 9,690,099 B2 | 6/2017 | Bar-Zeev | |
| 9,690,118 B2 | 6/2017 | Etzkorn | |
| 9,933,634 B2 | 4/2018 | Wiser | |
| 10,133,090 B2 | 11/2018 | Jiang | |
| 10,338,275 B1 | 7/2019 | Acosta | |
| 10,643,392 B2 * | 5/2020 | Schowengerdt | ........ G06T 17/10 |
| 2004/0027536 A1 | 2/2004 | Blum | |
| 2004/0156021 A1 | 8/2004 | Blum | |
| 2012/0140167 A1 | 6/2012 | Blum | |
| 2012/0154277 A1 | 6/2012 | Bar-Zeev | |
| 2012/0268712 A1 | 10/2012 | Egan et al. | |
| 2014/0306866 A1 | 10/2014 | Miller | |
| 2015/0185503 A1 | 7/2015 | Tate | |
| 2015/0339570 A1 * | 11/2015 | Scheffler | .................. G06N 3/04 706/16 |
| 2015/0362756 A1 * | 12/2015 | Wiser | ................. G02B 27/0093 351/210 |
| 2016/0026253 A1 * | 1/2016 | Bradski | ................ H04N 13/344 345/8 |
| 2016/0091737 A1 * | 3/2016 | Kim | ........................ G02C 7/04 351/158 |
| 2016/0252748 A1 | 9/2016 | Jiang | |
| 2016/0299354 A1 | 10/2016 | Shtukater | |
| 2017/0023793 A1 * | 1/2017 | Shtukater | ............. G02B 27/017 |
| 2017/0192253 A1 | 7/2017 | Rubinstein et al. | |
| 2017/0227792 A1 * | 8/2017 | Starner | ................ A61B 5/1103 |
| 2017/0270636 A1 * | 9/2017 | Shtukater | ............... H04N 5/332 |
| 2018/0045965 A1 * | 2/2018 | Schowengerdt | ........ G06F 3/011 |
| 2018/0110614 A1 | 4/2018 | Hyde | |
| 2018/0373058 A1 * | 12/2018 | Bostick | .................... G02C 7/04 |

OTHER PUBLICATIONS

Anonymous, "Emacula" [Accessed Feb. 12, 2018] http://www.emacula.io/.

L. Greenemeier,"Computerized Contact Lenses Could Enable In-Eye Augmented Reality," Nov. 23, 2011, [Accessed Feb. 12, 2018] https://blogs.scientificamerican.com/observations/computerized-contact-lenses-could-enable-in-eye-augmented-reality/.

J. Hong, et al., "See-through optical combiner for augmented reality head-mounted display: index-matched anisotropic crystal lens," Scientific Reports, Jun. 5, 2017, pp. 1-11.

H. Hua, et al., "A 3D integral imaging optical see-through headmounted display," Jun. 2, 2014, vol. 22, No. 11, DOI:10.1364/OE.22.013484, Optics Express, pp. 13484-13491.

Anonymous, "Variable focussing spectacles for patients with intraocular lenses," IP.com, Prior Art Database Technical Disclosure, Feb. 4, 2005, IPCOM000042880D, pp. 1-2.

N. Lee, "Avegant's light-field tech gives hope to a mixed-reality future," May 1, 2017 [Accessed Feb. 11, 2018] https://www.engadget.com/2017/05/01/avegant-light-field-hands-on/.

N. Padmanaban, et al. "Optimizing virtual reality for all users through gaze-contingent and adaptive focus displays," PNAS, Feb. 28, 2017, vol. 114, No. 9, pp. 2183-2188.

International Search Report and Written Opinion dated May 9, 2020 for International Application No. PCT/IB2020/050231 filed on Jan. 13, 2020.

List of IBM Patents or Patent Applications Treated as Related, Nov. 19, 2020, pp. 1-2.

* cited by examiner

DELIVERING AUGMENTED REALITY VIA EMBEDDED CONTACT LENS

BACKGROUND

The present disclosure generally relates to contact lenses and, more particularly, to smart contact lenses.

Known smart contact lenses include, for example, a front-facing camera, solar self-power units, LED light and/or antennae to connect to mobile devices. Augmented reality (AR) is an interactive experience of a real-world environment where the objects that reside in the real-world are "augmented" by computer-generated perceptual information. The overlaid sensory information can be constructive (i.e., additive to the natural environment) or destructive (i.e., masking of the natural environment) and is seamlessly interwoven with the physical world such that it is perceived as an immersive aspect of the real environment. In this way, augmented reality alters one's ongoing perception of a real world environment, whereas virtual reality completely replaces the user's real world environment with a simulated one.

SUMMARY

Shortcomings of the prior art are overcome and additional advantages are provided through the provision, in one aspect, of a computer-implemented method. The computer-implemented method includes: receiving, by the data processing system, data indicating a current focal point of a user with an embedded contact lens; and delivering, by the data processing system, augmented reality content to the user via the embedded contact lens such that it appears to the user to be at the current focal point.

In another aspect, a system may be provided. The system includes a memory; and at least one processor in communication with the memory, the memory storing program code executable by the at least one processor to perform a method. The method includes: receiving, by the data processing system, data indicating a current focal point of a user with an embedded contact lens; and delivering, by the data processing system, augmented reality content to the user via the embedded contact lens such that it appears to the user to be at the current focal point.

In yet another aspect, a computer program product may be provided. The computer program product includes a storage medium readable by a processor and storing instructions executable by the processor for performing a method of delivering augmented reality content on a contact lens of a user. The method includes: receiving, by the data processing system, data indicating a current focal point of a user with an embedded contact lens; and delivering, by the data processing system, augmented reality content to the user via the embedded contact lens such that it appears to the user to be at the current focal point.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
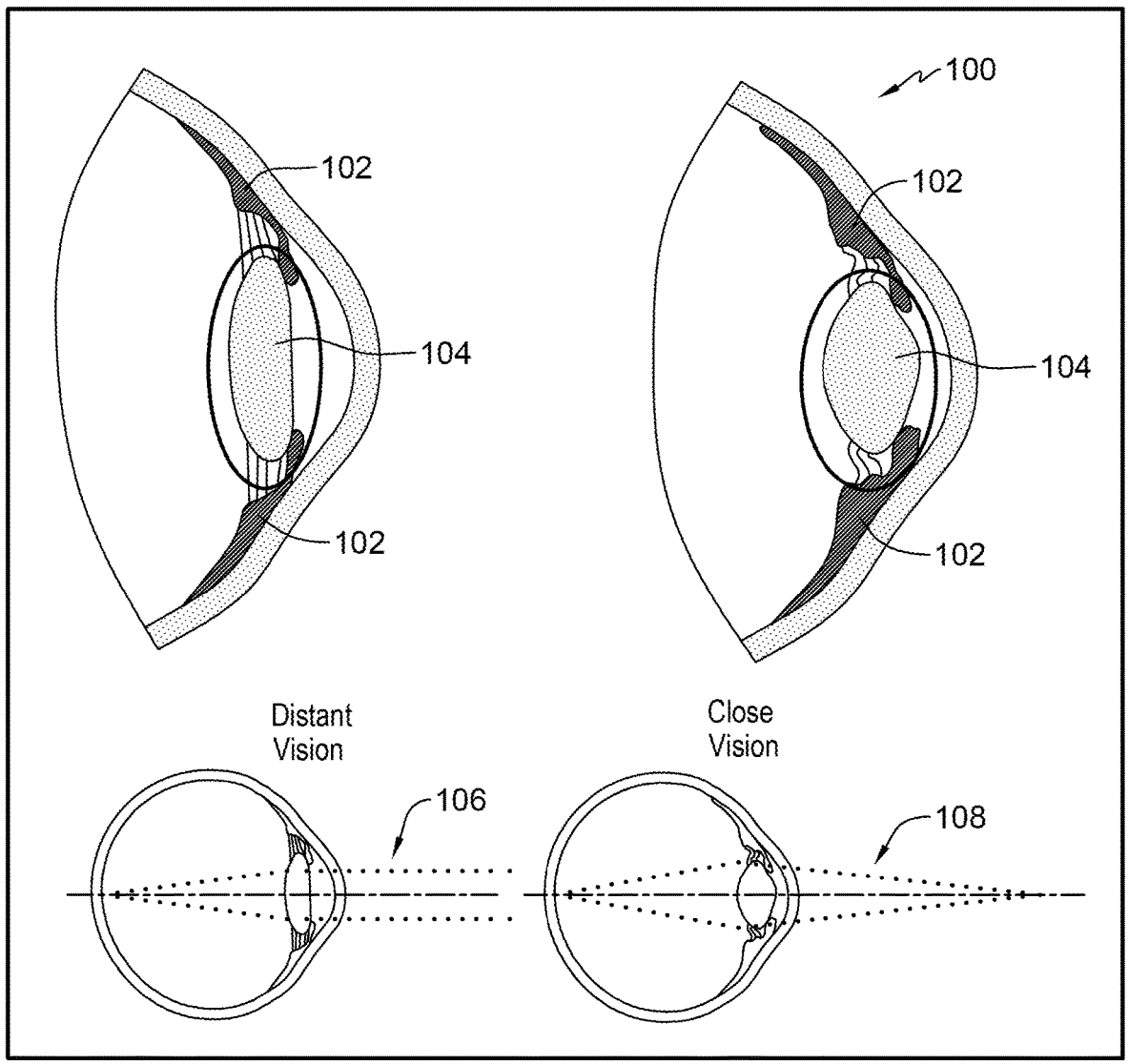
FIG. 1 depicts one example of natural eye accommodation without a contact lens.

Disclosed is a capability of "smart" contact lenses for automated scanning of the shape and dimensions of the eye lens and determining from that the user's focal point of view (referred to as "eye accommodation"). This enables the system to project content dynamically based on the correct eye accommodation. Also disclosed is the capability to predict a current activity of the user from contextual information, for example, a history of the user's activities and eye accommodation, GPS (Global Positioning System), maps and input from other devices are used to automatically move the eye accommodation to the correct setting on time without noticeable latency.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

As described, the human eye can see far, or see near, and everything in between, depending on the shape of the eye lens, which is controlled by muscle. Eye accommodation has a response time, it is not instantaneous, though it may be perceived as such by the user. For example, given a stabilization period, during any high-speed activity such as driving a car or playing sports, fast reaction times are needed for the eyes to adjust accordingly, which could take up to, for example, 25 meters for driving a vehicle at a relatively reasonable speed. Now consider a sport also needing fast response times. As another example, consider auto racing when something happens far out in front of a driver and the driver needs to look up and change eye accommodation to see what is happening in time to avoid a collision, for example.

Disclosed herein is a capability for contact lenses to project augmented reality content to the user at the current focus point of the user to let them know precisely what may be happening at different vision distances prior to eye accommodation. Also disclosed is the ability to identify the current focus distance, and the contact lens based augmented reality content will be projected at the calculated focus distance.

Provided is a capability to scan the shape and dimension of eye lens to calculate the current focus distance of a user, and use that information to provide augmented reality at the given eye focus point of view. Additionally, the dimension of the augmented reality content will be calculated dynamically based on the projected distance of the augmented reality content. Also provided is a capability to predict the user's current activity from contextual information, for example, from an activity history for the user, GPS coordinates of the user, maps and input from electronic devices (e.g., a smart phone) and automatically provide the eye accommodation to the correct setting in time to be relevant and useful.

Figure 2:
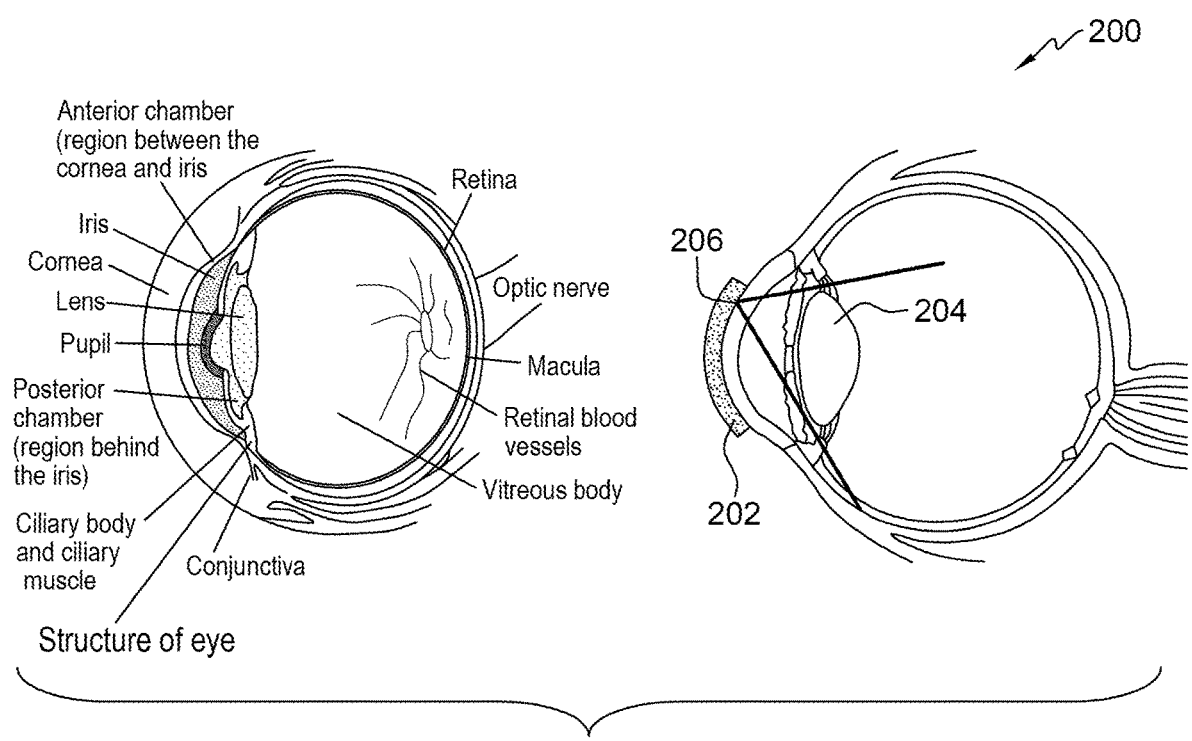
FIG. 2 depicts one example of a contact lens capable of determining the shape of the eye, in accordance with one or more aspects of the present disclosure.

FIG. 2 depicts one example of a human eye 200 wearing a contact lens 202 as disclosed herein. The lens 204 of the eye is measured for shape and dimensions by camera 206 (e.g., digital, informed, etc.) placed, for example, at an inner edge of the contact. Cameras or other technology can be used to determine focal distance (e.g., the distance of the first object in the noted direction). This is the object in the current view of the user. For example, one way of determining a focal distance is to use the thin lens equation (e.g., Gaussion form); that is:

$$\frac{1}{O} + \frac{1}{I} + \frac{1}{F}$$

where O=object distance (i.e., distance of object to center of eye lens),
I=image distance (i.e., the distance from lens center to where image is formed) and
F=focal length (i.e., the distance of the lens at rest to the retina).

FIG. 1 depicts one example of natural eye accommodation 100 without a contact lens. At a far end of sight, the ciliary muscles 102 are relaxed and the eye lens 104 is relatively flat in shape due to taught fibers. The light rays 106 from distant objects are nearly parallel and do not need as much refraction to bring them in focus. The eye accommodates for close vision by tightening the ciliary muscles (fibers slack), allowing the pliable crystalline lens to become more rounded. Light rays 108 from close objects diverge and require more refraction for focusing.

Figure 3:
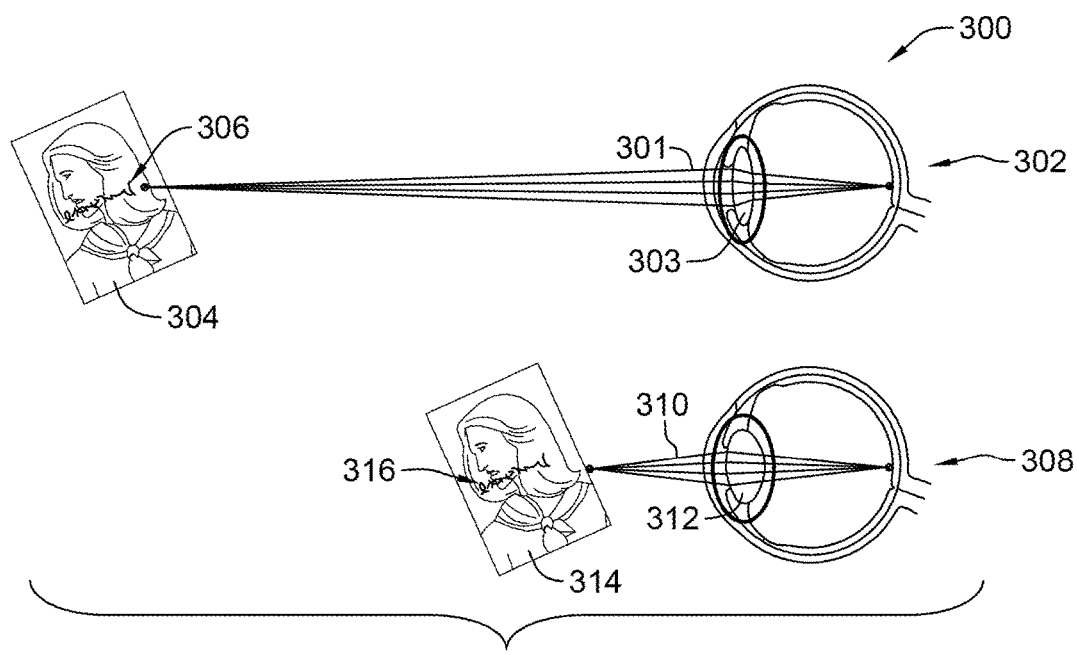
FIG. 3 depicts one example of projecting content from a contact lens at the proper distance, in accordance with one or more aspects of the present disclosure.

FIG. 3 depicts is one example of a contact lens disclosed herein, projecting 300 augmented reality content based on current eye focus distance described with respect to FIG. 2. In FIG. 3, a user can view the content without changing the latent eye accommodation. While various aspects of augmented reality content projection may be known, it is not known to project such content without changing the latent eye accommodation of the user. In other words, the improvement in this context is projecting augmented reality content at the current focus distance of the user, such that no eye accommodation is required. Where a user's current focus is far 302, the light rays 301 are nearly parallel and the lens 303 is relatively flat. The user is looking at a person 304 and the augmented reality content 306 is projected at the same focal distance, appearing over the person. Where a users' current focus is near 308, the light rays 310 are diverging and the lens 312 is relatively oval or rounded in shape. The user is looking at a person 314 that is relatively close in distance and the augmented reality content 316 is projected at the same focal distance, appearing over the person. Note that the augmented reality content could be anything; it is shown in FIG. 3 for ease of understanding.

Components of the disclosed system include, for example, a contact lens with integrated camera(s). The system uses the integrated camera(s) (in one embodiment, infrared camera(s)) to detect the shape of the eye to figure out the user's focus distance.

In one embodiment, the system could also make use of a paired smart phone (or GPS capability built into the contact with mapping built into the software system). The smart phone can be used to track positions and activities and predict eye accommodation.

A paired smart television or other devices as appropriate can also be employed. In one example, a smart television or other smart display communicating to the system whether it is on or off and thus predicting the user is watching television (because the user is also in a room having a television, per the GPS, etc.).

In one embodiment, a database can be associated with the system for keeping records about typical eye accommodation for various activities as described below.

The disclosed contact has, in one embodiment, an onboard integrated camera which is used to measure the lens of the eye. The shape of the eye will be measured as will the dimensions. In one example, the scanning module (e.g., camera) will be placed at the inner side of the contact lens toward the eye ball.

Specific eye shape changes are known and will be charted out to correlate curvature apex compared to distance of view. In addition, these numbers can be refined over time by monitoring and storing (e.g., in a database) known activities and distances compared to this user's specific eye lens shape to distance. In one embodiment, a testing cycle can be set up the first time a user wears the contacts, where the user would look at objects from known distances and the eye camera would capture and record the shape and size and correlate that shape and size to the distance being viewed.

Additionally, as time goes on, a user may access the stored eye data and change the numbers accordingly. For example, if the driving accommodation is set as per most people that look over their dashboard, one user may want to adjust the distance up or down.

Figure 7:
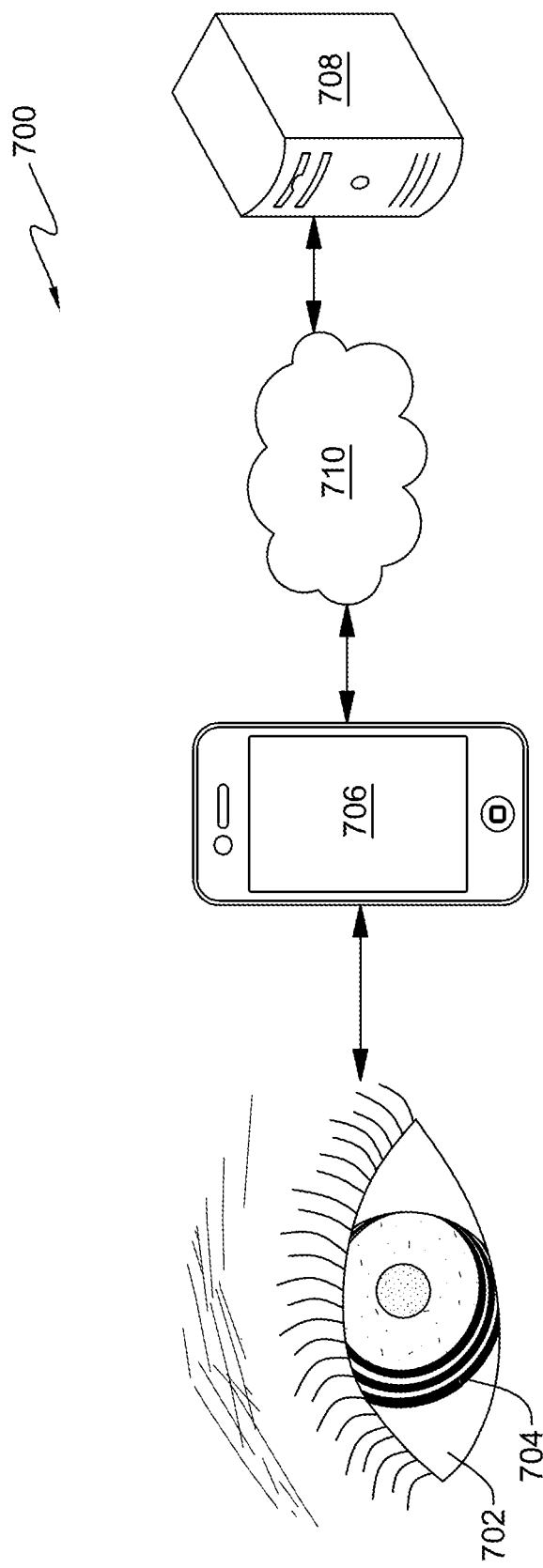
FIG. 7 is a block diagram showing one example of a communications network supporting the delivery of augmented reality content, in accordance with one or more aspects of the present disclosure.

FIG. 7 is a modified block diagram of one example of a network 700 for serving augmented reality to a user. Situated on an eye 702 of the user is a contact lens 704, as described herein. The contact lens is paired to an electronic device 706 (e.g., of the user) capable of communicating with a system 708 over the Internet 710 or other communications network. The electronic device in one example is a smart phone of the user paired to the contact lens by, for example, a short range communications protocol (e.g., Bluetooth). In light of current technology, the device (here, a smart phone) is used for communication on the network, for its sensors (giving context to the user's activity) and for GPS capability. However, as features continue to shrink, it is envisioned that the contact lens may already or will soon be able to communicate with the system, send contextual information via integrated sensors and provide location information, without the need for the smart phone or other device.

Thus, as discussed herein, the known current focal point can be calculated based on the shape of the eye and this focal point can be stored in memory and used in a later stage for projection.

In one embodiment, there is a predictive capability that allows the system to learn about the user and set focal points based on actual activities or cognitively predicted activities of the user.

The contact lens can be paired with the user's mobile device (or other device) to share information.

A user's mobile device will be able to identify the user's current activity in some cases. For example, the GPS and mapping software available in smart phones would allow the system to understand the user is on the roadways in a vehicle. Furthermore, there may be a proximity sensor installed in the vehicle, for example, in driver seat, to understand if the user may be driving.

In another example, a user may have a favorite seat to watch television, and a connected smart television may provide an answer that the user is currently watching, and when the user looks towards the screen, the known accommodation distance is used.

In a third example, a user has season tickets to a sporting event and the discovered distance from the field, for example, at a sports stadium, is known. Accordingly, when the user is watching the field, the system knows what accommodation to use.

The paired smart phone understands the location and positioning of the user to within a foot based on current technology. Over time, a user may have a predominance of times when the accommodation is set similarly, and based on that when the same position is taken, the accommodation can be predicted ahead of time and changed in real time.

In the driving example, the accommodation is not even important unless driving is happening. So, stopped at a light and looking around, there would be no need to project anything. So, while in the driver seat and on the roadways, the accommodation can be set to the known driving accommodation (for drivers looking to horizon over the dashboard).

In the home example, as the user sits in his favorite seat, his paired smart phone knows that and the smart television may also provide information to our system in some embodiments (to let our system know the television is on). Based on knowing the newly positioned user and the state of the television, we can set the accommodation distance accordingly.

Disclosed is an improvement to the augmented reality projection ensuring that the projection of augmented reality is at the current eye accommodation so that the user would not have to change their physical eye accommodation, thus allowing a quicker time to view while keeping them in the same focal area that they already were.

If any notification is to be displayed as part of the augmented content, then contact lens will be scanning the eye lens and accordingly will be calculating current focus distance of the user, as previously described.

The contact lens will be projecting the content at eye focus distance, so that there is no need for physical eye accommodation to view the content. The dimensions of the projected content would be changed as needed to match the eye accommodation, and thus the user will be able to comfortably see the content without adjusting their eyes.

In a first aspect, disclosed above is a computer-implemented method. The computer-implemented method includes receiving, by a data processing system, data indicating a current focal point of a user with an embedded contact lens; and delivering, by the data processing system, augmented reality content to the user via the embedded contact lens such that it appears to the user to be at the current focal point.

In one example, the data may include, for example, data regarding a shape and dimension(s) of an eye lens of the user. In one example, the contact lens may include, for example, a camera integrated with the contact lens on an inner surface of the contact lens, the computer-implemented method further including measuring the shape and dimension(s) using the camera.

In one example, when the shape of the eye lens is relatively flat, the data processing system may deliver, for example, the augmented reality content at a relatively far distance and when the shape of the eye lens is relatively rounded, the data processing system may deliver, for example, the augmented reality content at a relatively near distance.

In one example, the delivery in the computer-implemented method of the first aspect may be, for example, performed prior to eye accommodation.

In one example, the computer-implemented method of the first aspect may further include, for example, cognitively predicting, by the data processing system, a current activity of the user, resulting in a cognitively predicted activity. In one example, the cognitively predicting may include, for example, receiving, by the data processing system, contextual information and the cognitively predicted activity may be, for example, based, at least in part, on the contextual information. In one example, the contextual information may include, for example, sensor-based data from a mobile device of the user in communication with the contact lens.

In one example, the delivering in the computer-implemented method of the first aspect may include, for example, projecting the augmented reality content over what is being viewed by the user.

In one example, the contact lens in the computer-implemented method of the first aspect may be, for example, paired to a smart phone of the user and the contextual information may include, for example, information from sensor(s) of the smart phone. In one example, the sensor(s) may include, for example, at least one of a movement-based sensor, an accelerometer and a light sensor.

In a second aspect, disclosed above is a system. The system includes: a memory; and processor(s) in communication with the memory, the memory storing program code executable by the processor(s) to perform a method. The method includes: receiving, by a data processing system, data indicating a current focal point of a user with an embedded contact lens; and delivering, by the data processing system, augmented reality content to the user via the embedded contact lens such that it appears to the user to be at the current focal point.

In one example, the contact lens may include, for example, a camera integrated with the contact lens on an inner surface of the contact lens, the computer-implemented method further including measuring the shape and one or more dimension using the camera.

In one example, the system of the second aspect may further include, for example, cognitively predicting, by the data processing system, a current activity of the user, resulting in a cognitively predicted activity. In one example, the cognitively predicting may include, for example, receiving, by the data processing system, contextual information and the cognitively predicted activity may be, for example, based, at least in part, on the contextual information. In one example, the contextual information may include, for example, sensor-based data from a mobile device of the user in communication with the contact lens.

In a third aspect, disclosed above is a computer program product. The computer program product includes: a storage medium readable by a processor and storing instructions executable by the processor for performing a method of delivering augmented reality content on a contact lens of a user, the method comprising: receiving, by a data processing system, data indicating a current focal point of a user with an embedded contact lens; and delivering, by the data processing system, augmented reality content to the user via the embedded contact lens such that it appears to the user to be at the current focal point.

In one example, the contact lens may include, for example, a camera integrated with the contact lens, the computer-implemented method further including measuring the shape and one or more dimension using the camera.

In one example, the method of the computer program product of the third aspect may further include, for example, cognitively predicting, by the data processing system, a current activity of the user, resulting in a cognitively predicted activity. In one example, the cognitively predicting may include, for example, receiving, by the data processing system, contextual information and the cognitively predicted activity may be, for example, based, at least in part, on the contextual information. In one example, the contextual information may include, for example, sensor-based data from a mobile device of the user in communication with the contact lens.

Certain embodiments herein may offer various technical computing advantages involving computing advantages to address problems arising in the realm of computer networks, in particular, problems with augmented reality projection and eye accommodation. Various decision data structures can be used to drive artificial intelligence (AI) decision making, such as decision data structure that cognitively performs one or more function described herein, for example, cognitively predicting an activity of a user. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can project augmented reality content in a user's view at their current focal point. Embodiments herein use camera(s) integrated with a contact lens to measure aspect(s) of a user's eye lens. Embodiments herein can use contextual information (e.g., sensor data from a paired smart phone and/or smart watch) to better understand a current activity of the user. Embodiments herein can include particular arrangements for both collecting rich data into a data repository and additional particular arrangements for updating such data and for use of that data to drive artificial intelligence decision making.

In one example, a cognitive computer system performs a cognitive function as described herein. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people;

ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As used herein, terms taking the form of "cognitive(ly) <function>" refers to the use of cognitive computing in performing the function for users in real-time, for example, "cognitively predicting" a user's current activity. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

Figure 4:
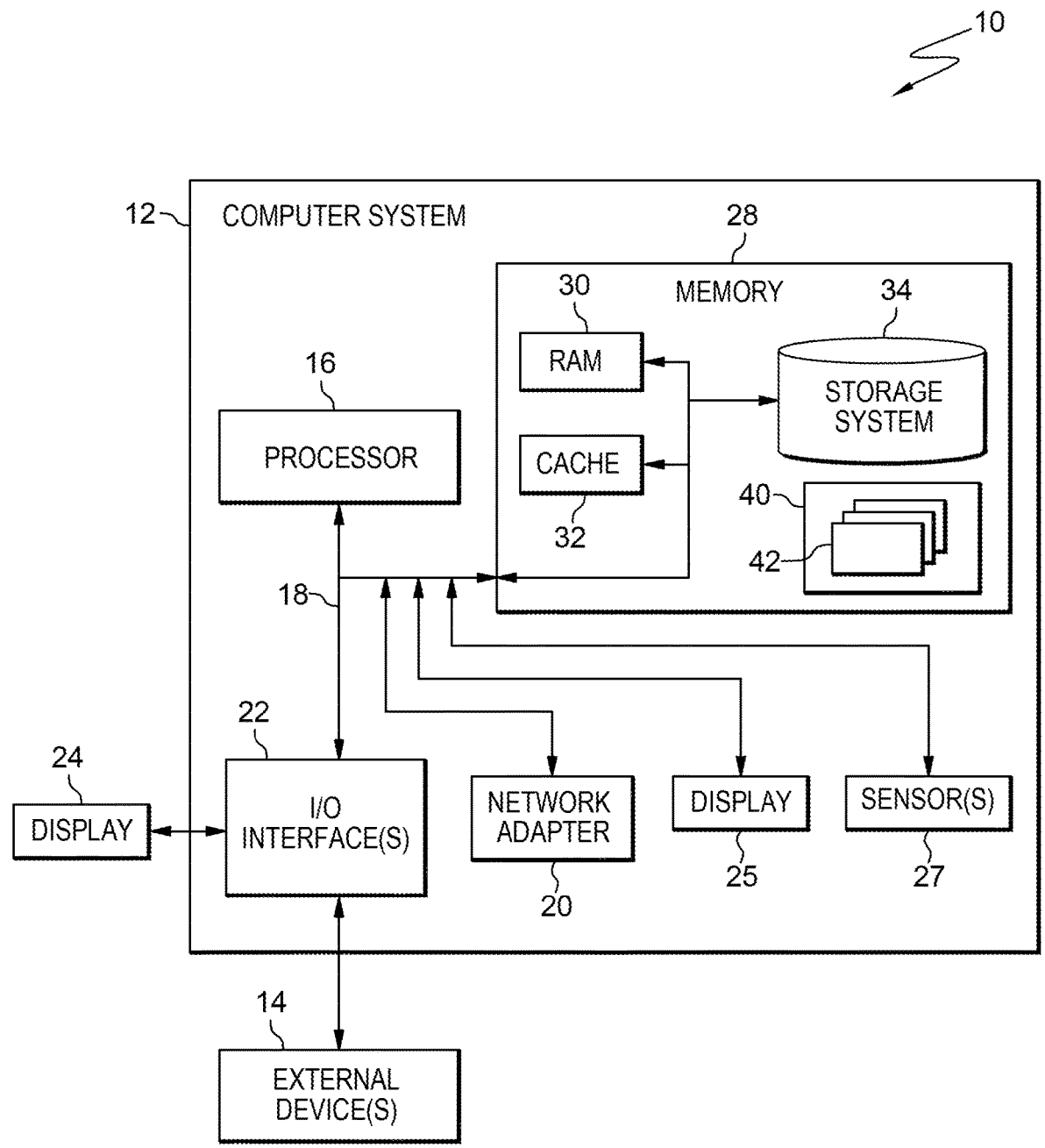
FIG. 4 is a block diagram of one example of a computer system, in accordance with one or more aspects of the present disclosure.
Figure 5:
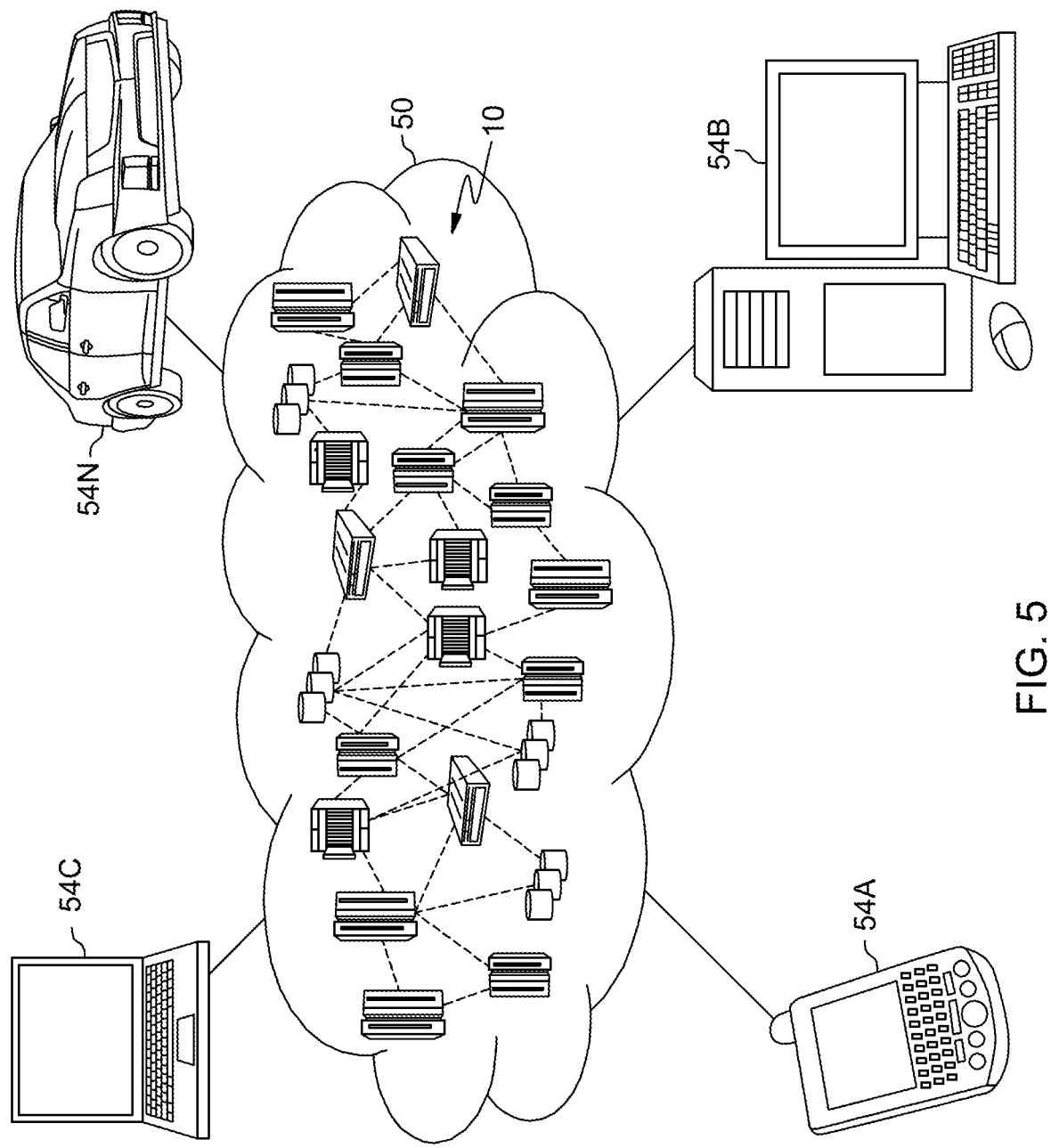
FIG. 5 is a block diagram of one example of a cloud computing environment, in accordance with one or more aspects of the present disclosure.
Figure 6:
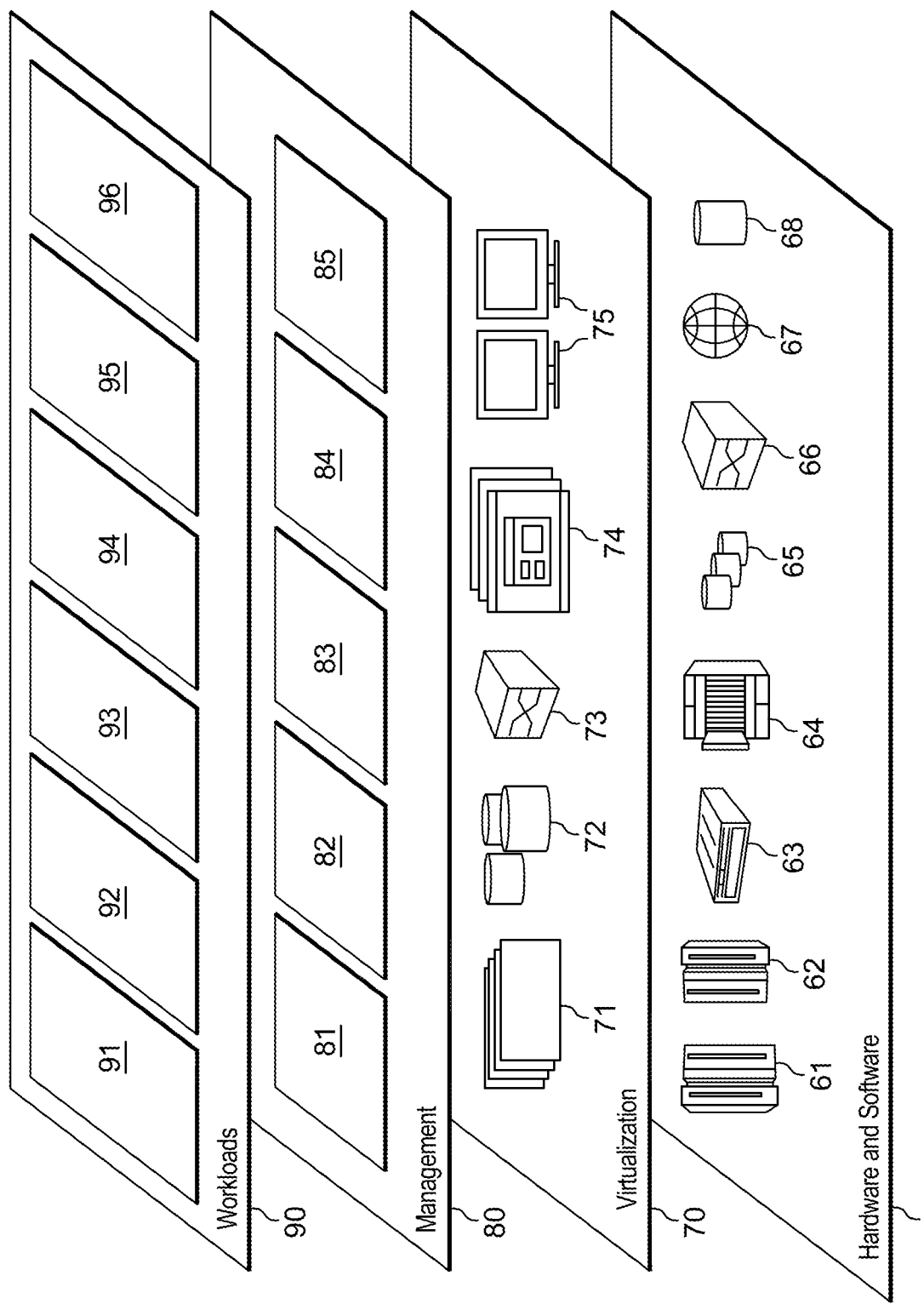
FIG. 6 is a block diagram of one example of functional abstraction layers of the cloud computing environment of FIG. 5, in accordance with one or more aspects of the present disclosure.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 4 computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 4.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer-implemented method, comprising:
receiving, by a data processing system, data indicating a current focal point of a user wearing a contact lens; and
delivering, by the data processing system, augmented reality content to the user via the contact lens such that it appears to the user to be at the current focal point, wherein no change in the current focal point of the user is needed to see the augmented reality content, and wherein the delivering comprises projecting the augmented reality content over what is being viewed by the user.

2. The computer-implemented method of claim 1, wherein the data comprises data regarding a shape and one or more dimension of an eye lens of the user.

3. The computer-implemented method of claim 2, wherein the contact lens comprises a camera integrated with the contact lens on an inner surface of the contact lens, the computer-implemented method further comprising measuring the shape and the one or more dimension using the camera.

4. The computer-implemented method of claim 1, wherein the delivering is performed prior to a change in focal point of the user.

5. The computer-implemented method of claim 1, further comprising cognitively predicting, by the data processing system, a current activity of the user, resulting in a cognitively predicted activity.

6. The computer-implemented method of claim 5, wherein the cognitively predicting comprises receiving, by the data processing system, contextual information and wherein the cognitively predicted activity is based, at least in part, on the contextual information.

7. The computer-implemented method of claim 6, wherein the contextual information comprises sensor-based data from a mobile device of the user in communication with the contact lens.

8. The computer-implemented method of claim 7, wherein the contact lens is paired to a smart phone of the user and wherein the contextual information comprises information from one or more sensor of the smart phone.

9. The computer-implemented method of claim 8, wherein the one or more sensor comprises at least one of a movement-based sensor, an accelerometer and a light sensor.

10. A system, comprising:
a memory; and
at least one processor in communication with the memory, the memory storing program code executable by the at least one processor to perform a method, the method comprising:
receiving, by a data processing system, data indicating a current focal point of a user wearing a contact lens; and
delivering, by the data processing system, augmented reality content to the user via the contact lens such that it appears to the user to be at the current focal point, wherein no change in the current focal point of the user is needed to see the augmented reality content, and wherein the delivering comprises projecting the augmented reality content over what is being viewed by the user.

11. The system of claim 10, wherein the contact lens comprises a camera integrated with the contact lens on an inner surface of the contact lens, the computer-implemented method further comprising measuring a shape and one or more dimension of the user's eye lens using the camera.

12. The system of claim 10, further comprising cognitively predicting, by the data processing system, a current activity of the user, resulting in a cognitively predicted activity.

13. The system of claim 12, wherein the cognitively predicting comprises receiving, by the data processing system, contextual information and wherein the cognitively predicted activity is based, at least in part, on the contextual information.

14. The system of claim 13, wherein the contextual information comprises sensor-based data from a mobile device of the user in communication with the contact lens.

15. A computer program product, comprising:
a computer-readable storage medium readable by a processor and storing instructions executable by the processor for performing a method of delivering augmented reality content to a user, the method comprising:
receiving, by a data processing system, data indicating a current focal point of a user wearing a contact lens; and
delivering, by the data processing system, augmented reality content to the user via the contact lens such that it appears to the user to be at the current focal point, wherein no change in the current focal point of the user is needed to see the augmented reality content, and wherein the delivering comprises projecting the augmented reality content over what is being viewed by the user.

16. The computer program product of claim 15, wherein the contact lens comprises a camera integrated with the contact lens on an inner surface of the contact lens, the computer-implemented method further comprising measuring a shape and one or more dimension of the user's eye lens using the camera.

17. The computer program product of claim 15, further comprising cognitively predicting, by the data processing system, a current activity of the user, resulting in a cognitively predicted activity.

18. The computer program product of claim 17, wherein the cognitively predicting comprises receiving, by the data processing system, contextual information and wherein the cognitively predicted activity is based, at least in part, on the contextual information.

19. The computer program product of claim 18, wherein the contextual information comprises sensor-based data from a mobile device of the user in communication with the contact lens.

* * * * *